United States Patent [19]

Pitts

[11] 4,150,092

[45] * Apr. 17, 1979

[54] PROCESS FOR RECOVERING VANADIUM VALUES FROM ACIDIC CHLORIDE SOLUTIONS

[75] Inventor: Frank Pitts, Magalas, France

[73] Assignee: Engelhard Minerals & Chemicals Corporation, Edison, N.J.

[*] Notice: The portion of the term of this patent subsequent to Nov. 21, 1995, has been disclaimed.

[21] Appl. No.: 844,200

[22] Filed: Oct. 21, 1977

[51] Int. Cl.² ............................................. C01G 31/00
[52] U.S. Cl. ....................................... 423/63; 423/64; 423/67; 423/68; 423/65; 423/144; 423/166; 423/DIG. 14
[58] Field of Search ................... 423/63, 68, DIG. 14, 423/658.5; 75/101 BE

[56] References Cited

U.S. PATENT DOCUMENTS

| 3,083,085 | 3/1963 | Lewis et al. | 423/63 |
|---|---|---|---|
| 3,257,164 | 6/1966 | Drobnick et al. | 423/63 |
| 3,320,024 | 5/1967 | Benwell | 423/63 |
| 3,348,906 | 10/1967 | Henrickson et al. | 423/63 |
| 3,554,692 | 1/1971 | Brast et al. | 423/63 |
| 3,975,495 | 8/1976 | Bowerman | 423/65 |

FOREIGN PATENT DOCUMENTS 805025 11/1958 United Kingdom ..................... 423/63

Primary Examiner—Herbert T. Carter
Attorney, Agent, or Firm—Inez L. Moselle

[57] ABSTRACT

The present invention provides a method for recovering vanadium from ferruginous chloride solutions by liquid-liquid extraction (or liquid ion exchange). Such chloride solutions are obtained in the extraction of vanadium from vanadiferous residues arising from the chlorination of titaniferous ores and in the extraction of vanadium from vanadiferous minerals. These solutions contain chlorides of vanadium, aluminum, iron, manganese and chromium. The method comprises adding sulfate ions to the chloride solution and recovering the vanadium by liquid-liquid extraction. By adjusting the sulfate-additive in relation to the concentrations of vanadium, iron and chloride in the solution vanadium can be exhausted substantially free from iron.

9 Claims, No Drawings

PROCESS FOR RECOVERING VANADIUM VALUES FROM ACIDIC CHLORIDE SOLUTIONS

RELATED APPLICATIONS

This application is a continuation-in-part of copending U.S. application Ser. No. 781,753, filed March 28, 1977 now U.S. Pat. No. 4,100,252.

BACKGROUND OF THE INVENTION

The present invention relates to the hydrometallurgical extraction of metals, particularly vanadium, niobium, tantalum and zirconium, especially from ores, mineral concentrates and from certain industrial process residues in all of which these metals are associated with other metals. In some cases these other metals constitute undesirable impurities such as aluminum, silicon and iron and in others they constitute commercially valuable materials which are extracted along with vanadium or subsequently to the extraction of vanadium as, for example, in carnotite ores from which vanadium and uranium are coextracted. In this application "industrial process residues" or simply "residues" refers to material remaining after extraction of a primary product in a chemical or hydrometallurgical process. Such residues may be treated as waste products of the process or they may be further extracted to recover one or more constituents of commercial value.

The present invention is especially but not exclusively applicable to the extraction of vanadium from residues obtained in the manufacture of titanium dioxide by the high temperature fluidized bed chlorination (so-called "chloride" processing) of titanium-containing ores such as rutile, ilmenite or leucoxene or ore preconcentrates such as so-called "upgraded ilmenite" or mixtures thereof. Since these ores and ore preconcentrates contain, in addition to titanium, several other elements such as vanadium, zirconium, niobium, tantalum, chromium, iron, aluminum and silicon, the presence of which would be undesirable in the titanium dioxide which is the primary product of the process, they have to be separated and are removed from the plant as residues. These residues also contain a comparatively small proportion of the titanium extracted in the process. Examples of such residues arising from the chorination of rutile to produce titanium tetrachloride are given in U.S. Bureau of Mines Report of Investigation Nos. 7221 (1969) and 7671 (1972). The major components of the residue described are titanium as unreacted rutile and unrecovered titanium tetrachloride, carbon (coke) added in the chlorination process and chlorine as metal chlorides. The impurity metals—vanadium, zirconium, niobium, iron, etc., are present in concentrated form in the residue remaining after distilling off the bulk of the titanium tetrachloride. A typical analysis of the residues appears in the following table.

TABLE I

| | Percent by Weight |
|---|---|
| V | 4.4 |
| Nb | 2.4 |
| Ta | 1.1 |
| Zr | 2.4 |
| Ti | 10.5 |
| Fe | 4.2 |
| Cr | 1.0 |
| Mn | 0.08 |
| Al | 2.2 |
| Cl | 26.0 |
| C | 33.0 |
| $SiO_2$ | 4.5 |

TABLE I-continued

It will be noted that the remainder of such residues is combined oxygen and minor amounts of other metals.

The recovery of vanadium and niobium from such residues is a commercially desirable objective. Moreover, such residues are difficult to dispose of as waste material since they contain readily hydrolyzable chlorides which generate hydrochloric acid fumes on contact with moisture and also they contain toxic metals, notably vanadium. Thus the so-called "fuming" residues cannot conveniently be stored or dumped in the state in which they are obtained from the extraction process.

In U.S. Pat. No. 3,975,495 to Bowerman a process is described for recovering niobium and vanadium from a solution obtained by aqueous extraction of vanadiferous residues similar to those used in the process of the present invention. In this process the solution containing substantially all the vanadium, niobium and zirconium is separated from the insoluble matter consisting of carbon and unreacted titaniferous ore and subsequently a separation of niobium and zirconium is effected by boiling in presence of sulfuric acid in order to precipitate these metals while leaving vanadium in solution. In the process of U.S. Pat. No. 3,975,495 vanadium is subsequently recovered by oxidation and partial neutralization whereby vanadium and iron are precipitated in a hydrous oxide form, known in the art as "red cake," and are separated from the residual solution by filtration. The recovery of vanadium as oxide or ammonium metavanadate, which are the commercially desirable products, requires further processing which is most usually effected by redissolving the "red cake" in sulfuric acid to form a solution compounded principally of iron sulfate and vanadic acid or vanadium sulfate, from which vanadium is then recovered by solvent extraction or liquid ion exchange. Such extraction processes are well known in the art; for example, one such process is desirable in "COMMERCIAL RECOVERY OF VANADIUM BY THE LIQUID ION EXCHANGE PROCESS" by R. R. Swanson, H. N. Dunning and J. E. House, ENGINEERING AND MINING JOURNAL, October 1961. The process described in U.S. Pat. No. 3,975,495 would be greatly simplified and would consequently be more economical if it were possible to use as a feed solution for the liquid ion exchange process the chloride solution containing vanadium and iron which is obtained after separating insoluble carbon, unreacted ore and niobium and zirconium. By using such a feed solution, the process stages of precipitation of "red cake" and redissolving it in sulfuric acid would thereby be obviated. However, it has not hitherto proved practicable to do this. The reason is that in acid chloride solutions part of the iron contained is present in anionic form, such as $FeCl_4^-$, and the iron in this form is extracted by the amine or quaternary ammonium compound used to extract vanadium (as vanadate) in the liquid ion exchange process. The result is that a complete separation of vanadium from iron is not achieved. An unsuccessful attempt to achieve such a direct separation of vanadium from iron by direct solvent extraction (or liquid ion exchange) of a chloride solution derived from residues of the chlorination of titaniferous ores is referred to in U.S. Bureau of Mines Report of Invesigations No. 7671.

In my copending application an improved process is described for recovering vanadium from residues of the chlorination of titaniferous ores and from other vanadiferous materials. This process also produces a chloride solution containing vanadium and iron from which vanadium can be recovered in the form of pure vanadium pentoxide or ammonium metavanadate by the conventional procedure of precipitating "red cake," redissolving this in sulfuric acid and separating vanadium from iron by liquid ion exchange. As in the case of the process of U.S. Pat. No. 3,975,495 it would therefore be a desirable objective to separate vanadium from iron by directly applying liquid ion exchange to the chloride solution but, for reasons already stated, this has not hitherto been practicable.

THE INVENTION

The invention concerns the extraction of vanadium by solvent extraction or liquid ion exchange from a chloride solution containing vanadium and iron without coextraction of iron whereby vanadium can be recovered as a pure compound by direct extraction of the chloride solution without the necessity to effect a preliminary precipitation of vanadium and iron and the redissolution of this precipitate in sulfuric acid. The process of the present invention comprises adding sulfate ions to the chloride solution prior to extraction of vanadate ions by means of an organic extraction in the liquid ion exchange process.

More specifically the invention comprises a process for the extraction of vanadium from ferruginous chloride solutions containing vanadium in the pentavalent state which comprises the steps of adding sulfate ions to the solution, adjusting the pH of the solution if necessary to a value within the range 1.4 to 3.0 and contacting the solution with an organic amine or quaternary ammonium compound whereby vanadate ions are transferred from the aqueous phase into the organic phase.

In a preferred embodiment sulfate ions are added as magnesium sulfate.

In another embodiment sulfate ions are added as sulfuric acid and the pH is adjusted to a value within the range 1.4 to 3.0 by addition of a material selected from the group consisting of magnesium oxide, magnesium hydroxide, magnesium carbonate or mixtures thereof.

In an especially preferred embodiment, the invention comprises a process for the extraction of vanadium from acid ferruginous chloride solutions containing vanadium in the pentavalent state which comprises the steps of adding magnesium sulfate, adjusting the pH of the solution to a value within the range 1.4 to 3.0 (if necessary) by adding magnesium oxide, magnesium hydroxide or magnesium carbonate (or mixtures thereof), contacting the solution with an organic amine or quaternary ammonium compound to transfer vanadate ions from the aqueous to the organic phase, separating the two phases, neutralizing the aqueous phase to a pH value of at least 3.5, preferably with magnesium oxide, hydroxide, carbonate or mixtures thereof, and separating the ferruginous hydroxide precipitate from the solution of magnesium chloride and magnesium sulfate. The solution of magnesium chloride and magnesium sulfate is preferably evaporated until hydrated magnesium sulfate crystallizes on cooling and is separated from the mother liquor which comprises a solution of magnesium chloride. The advantage is that magnesium sulfate can be recovered and recycled (cost saving) and that the end product of the whole process after extracting vanadium is salable magnesium chloride instead of waste sodium chloride.

It is believed that the effect of sulfate ions is to suppress the formation of iron-containing anions such as $FeCl_4^-$. Present experience indicates that the quantity of sulfate ions required is dependent upon the concentration of the chloride solution and also upon the relative proportions of iron and vanadium present. The higher the iron to vanadium ratio and the higher the concentration, the more sulfate ions are required. Provided that sufficient sulfate ions are present in the solution, vanadium can be extracted into the organic phase substantially without any coextraction of iron. By the customary process of re-extraction of vanadium from the organic phase into the aqueous phase by contacting the organic phase with an aqueous solution with which vanadium has a preferred affinity or reaction to that which it has for the organic extractant, a pure solution of vanadium is obtained substantially free from iron and from other metals present in the original chloride solution such as aluminum, manganese and trivalent chromium. This process of re-extraction into aqueous phase is known in the art of solvent extraction as "stripping" and the aqueous solution used to effect it is called a "stripping reagent" or "strip solution." When amines or quaternary ammonium compounds are employed as the organic extractant, the strip solution may be for example sodium carbonate, ammonium hydroxide or a mixture of ammonium hydroxide and ammonium chloride or ammonium sulfate. However, many other stripping reagents may be used and are mentioned in the literature; for example in the paper of Swanson et al (supra).

As mentioned above it is especially preferred to use magnesium sulfate as the source of sulfate ions and to employ basic magnesium compounds for all neutralization steps because the resulting spent chloride solution can be processed to produce magnesium sulfate which can be recycled and magnesium chloride which can be sold.

When other sulfates are used, after the vanadium is extracted the spent chloride solution (called "raffinate") contains $Na_2SO_4$, and NaCl together with $K_2SO_4$ or $(NH_4)_2SO_4$, if these were used as source of sulfate, and the raffinate also contains residual chlorides of Fe, Al, Cr and Mn. To meet environmental requirements this waste solution must be neutralized to precipitate the metals as hydroxides which are usually disposed of as land-fill. This precipitation is usually done by adding lime (for cheapness). This converts the chlorides to calcium chloride, which is disposed of as a waste solution. The process thus consumes $H_2SO_4$ or alkali sulfate, sodium hydroxide or carbonate and lime, which together produce a valueless waste.

In another especially preferred embodiment of the invention after extraction of vanadium, the raffinate is then neutralized with magnesium oxide, magnesium hydroxide or magnesium carbonate to precipitate the metals (Fe, Al, Cr, Mn) as hydroxide. A solution of magnesium chloride and magnesium sulfate is formed. This solution is partially evaporated and magnesium sulfate crystallized from it, removed by filtration and recycled in the process as source of sulfate ions. The filtrate is a solution of magnesium chloride which can be sold as such or evaporated and crystallized (or solidified) as $MgCl_2$ $6H_2O$ for sale. There is thus no waste except Fe, Al, Cr, Mn, hydroxides and the only con-

DETAILED DESCRIPTION

The present invention is especially useful in extracting vanadium from plant waste residues obtained by the chloride treatment of titaniferous ores such as rutile, ilmenite and leucoxene or ore concentrates such as upgraded ilmenite (hydrochloric acid leached ilmenite) as well as mixtures thereof. A chloride solution containing vanadium is obtained from such residues by the process described in the Bowerman patent or by that described in my allowed copending patent application but in either case the chloride solution also contains iron and other metals such as aluminum, manganese and chromium. The entire disclosure of my copending allowed application is incorporated herein by cross-reference. Briefly, in the process of the copending application fuming residues from the chloride process are moistened to render them non-fuming, and vanadium is extracted from the non-fuming residues by hot water or hot dilute sulfuric acid.

Sulfuric acid is preferably added to the water used for the first stage of the extraction when it is desired to effect near complete extraction of vanadium. For example, when residues have been allowed to age several weeks or more, boiling water alone may extract less vanadium (for example, only 75 to 80%) than from fresh residues. Addition of small amounts of sulfuric acid restores the extraction efficiency to over 90%. Generally sufficient sulfuric acid is used to form an aqueous solution which is in the range of about 0.05 N to 1 N. Subsequent extraction may use hot water to which no sulfuric acid is added.

Extraction is conducted at a temperature between about 160 to 212° F. at atmospheric pressure. Single and multi-stage extraction may be employed. As mentioned, the use of progressively increasing temperature results in a decrease in the amount of niobium and zirconium removed, whereby it is preferable to use water at the boiling point at atmospheric pressure (or as close thereto as is feasible). In most cases, extraction will require between about 10 minutes to 24 hours. Usually about 15 minutes to 1 hour will suffice. It is usually desirable to extract essentially all (for example 98% or more) of the vanadium in order to render the remainder of the residues non-noxious. In some cases 90% extraction or even less will suffice.

Treatment with hot water and removal of the extract solution may be performed by conventional methods and using conventional equipment. A washing-type press filter or rotary vacuum filter may conveniently be used. It is generally desirable to wash the extracted residue at least once with boiling water to remove residual vanadium. The washings may be recycled to the next extraction.

Once the vanadium has been removed the remaining residue may be safely dumped because it is no longer particularly toxic. Alternatively the remaining residue may be treated by means such as extraction with acid or by other means to remove zirconium and niobium, together with soluble titanium, in order to recover some or all of these materials. When tantalum is present it will usually be extracted along with niobium.

The aqueous vanadium extract which also contains iron and other metals is now treated with an oxidizing agent to convert vanadium to the pentavalent form in which it is then present in anionic form as vanadate anions. Oxidizing agents which may be used include chlorine and sodium or potassium chlorate although any oxidizing agent may be used which is capable of converting quadrivalent vanadium ions to pentavalent ions. The oxidation may be carried out by passing chlorine through the solution or adding sufficient chlorate to the solution to increase the electrode potential to 650 millivolts. The oxidation may be effected at ambient temperature or at elevated temperature up to the boiling point of the solution at atmospheric or superatmospheric pressure.

In applying the present invention to the recovery of vanadium from chloride solutions obtained by practice of the process of my copending allowed application, as outlined above, sulfuric acid or a soluble sulfate such as a sulfate of sodium, potassium, ammonium or magnesium is added to the oxidized chloride containing solution in sufficient quantity to prevent extraction of iron in the subsequent process of liquid ion exchange. The required quantity of sulfate ions is determined by experiment. For a solution containing two grams per liter of vanadium and three grams per liter of iron and having a chloride content (as Cl) of 10 grams per liter, the addition of 30 grams per liter of sulfuric acid or 43 grams per liter of sodium sulfate was sufficient to prevent coextraction of iron in the liquid ion exchange process. Using a solution containing three grams per liter of vanadium and 18 grams per liter of iron and having a chloride content of 45 grams per liter (as Cl) it was necessary to add 75 grams per liter of sulfuric acid or 178 grams per liter of sodium sulfate to prevent coextraction of iron.

After addition of sulfate ions it is necessary to adjust the pH of the solution to a suitable level to permit effective extraction of vanadate ions by the organic reagent. The required pH depends on the nature of the organic extractant used but where an amine or quaternary ammonium compound is used as the extractant, the pH appropriate for a given degree of vanadium extraction is shown in the paper already referred to by Swanson et al. For the purpose of the present invention the preferred pH is 1.4 to 2.6, more preferably 1.5 to 2.3. As mentioned above, pH adjustment is preferably carried out with a basic magnesium compound.

The extraction of vanadium is effected by shaking or stirring the vanadium containing chloride solution with a solution of the organic extractant in an organic solvent such as kerosene, allowing the two phases to separate into two layers and removing the aqueous layer from the organic layer. To remove the extracted vanadium, the organic phase is contacted by shaking or stirring with an aqueous stripping solution, which may be a solution which is 1.0 molar with respect to $NH_4OH$ and 1.5 molar with respect to $NH_4Cl$. After allowing the two phases to disengage, the aqueous layer, which now contains the vanadium as a solution of ammonium metavanadate and ammonium chloride, is separated from the organic phase. The aqueous solution is boiled to expel free ammonia whereby ammonium metavanadate is precipitated or crystallizes out and may be recovered by filtration.

In commercial practice it is usual to effect the extraction and stripping stages by a series of two or more countercurrent contact stages as described in the paper by Swanson et al. The concentration of organic reagent in the organic extractant and of the stripping solution and the volume ratio of organic to aqueous phase used in each stage are selected by experimental trial to provide the minimum number of contact stages consistent with acceptable degree of recovery of vanadium.

While the extraction and stripping may be carried out at ambient temperature, it is sometimes advantageous to employ elevated temperatures in either or both stages. For example, the final extraction stage may be effected at 100° to 120° F. in order more completely to extract vanadium into the organic phase and all the stripping stages may be carried out in the same temperature range to raise the solubility of the ammonium metavanadate formed in the strip solution and thus prevent its precipitation.

The following examples are given for illustrative purposes and are not considered to be limiting the invention to the specific features set forth therein.

EXAMPLE I

The residue obtained from extraction of titanium from rutile by the chloride process and treated with 10% water had the following metal analysis by weight:

|    | Percebt |
|----|---------|
| V  | 4.0     |
| Nb | 2.2     |
| Ta | 1.0     |
| Zr | 2.2     |
| Ti | 9.5     |
| Fe | 3.8     |
| Cr | 0.95    |
| Mn | 0.07    |
| Al | 2.0     |

The residues contained about 40% (wt.) carbon and analyzed about 22% Cl. Of the titanium values, about 2.4% was soluble and 7.1% was insoluble (rutile).

A sample of 100 grams of this water-treated residue was extracted by boiling with 200 ml. water for one hour, filtered and the filter cake was washed with 150 ml. of water. The volume of the combined filtrate and washings was 300 ml. was found to contain 13 grams per liter vanadium, 12 grams per liter iron and 65 grams per liter chloride (as Cl).

This solution was diluted to 600 ml. and heated to 190° F. and chlorine was passed through the solution until the EMF against a standard electrode was 700 millivolts. 36 grams sulfuric acid was added to the solution, which was then cooled to about 80° F. and the pH adjusted to 1.6 by addition of sodium hydroxide. The solution was then stirred for 20 minutes with 600 ml. of the organic extractant with gradual addition of sodium hydroxide as required to maintain the pH at 1.6. The composition of the organic extractant was as follows:

| ALAMINE 336* | 10% by volume |
|--------------|---------------|
| Kerosene     | 80% by volume |
| Iso-Decanol  | 10% by volume |

*ALAMINE 336 is a symmetrical, straight chain, saturated tertiary amine manufactured by General Mills, Inc. The alkyl groups are a $C_8$-$C_{10}$ mixture with the $C_8$ carbon chain predominating. It is also referred to as a commercial grade of TRI-CAPRYLYL AMINE.

The mixture was allowed to stand without stirring for 20 minutes and the lower aqueous layer was removed. To the remaining organic phase was added 600 ml. of the stripping solution (1.0 molar $NH_4OH$, 1.5 molar $NH_4Cl$). The mixture was stirred for 20 minutes at a temperature of 100° F. After allowing to stand without stirring for 20 minutes, the lower aqueous layer was removed and analyzed. It was found to contain 3.5 grams per liter vanadium (as V) and less than 0.05 grams per liter of iron (as Fe).

EXAMPLE II

This example illustrates an especially preferred embodiment of the invention. In this example the procedure of Example I was repeated with another sample of the same residue. The water-treated residue was extracted with hot water, filtered, washed and oxidized with chlorine, as described in Example I. Then 90 grams of $MgSO_4.7H_2O$ was added to the solution which was then cooled to about 80° F. and the pH adjusted to 1.6 by addition of magnesium hydroxide. The solution was then stirred for 20 minutes with 600 ml. of the organic extractant (see Example I) with gradual addition of magnesium hydroxide as required to maintain the pH at 1.6. The mixture was allowed to stand without stirring for 20 minutes and the lower aqueous layer was removed. To the remaining organic phase was added 600 ml. of the stripping solution (1.0 molar $NH_4OH$, 1.5 molar $NH_4Cl$) and the mixture was stirred for 20 minutes at a temperature of 100° F. After allowing to stand without stirring for 20 minutes, the lower aqueous layer was removed and analyzed. It was found to contain 3.5 grams per liter vanadium (as V) and less than 0.05 grams per liter of iron (as Fe).

The aqueous chloride solution from which vanadium had been extracted was neutralized with magnesium hydroxide to pH 6.5 to precipitate the hydroxides of iron, aluminum, chromium and manganese which was separated by filtration. The filtrate, containing magnesium chloride and magnesium sulfate, was evaporated until it contained 35% by weight $MgCl_2$ and was then cooled to 80° F. and the magnesium sulfate allowed to crystallize out. The magnesium sulfate crystals were removed by centrifugation and used to add sulfate ions to further chloride solutions in the vanadium extraction process. The mother liquor was a strong solution of magnesium chloride substantially free from sulfate.

I claim:

1. In a process for the recovery of vanadium from aqueous acidic ferruginous chloride solutions containing vanadium in the pentavalent state and iron in anionic form as a chloride complex by transfer of said vanadium into an organic solution of an organic amine or quaternary ammonium compound at a pH in the range of 1.4 to 3.0 and stripping the extracted vanadium with an aqueous strip liquid to recover the vanadium in aqueous solution, the improvement, whereby the vanadium is transferred from said chloride solution into said organic solution without preliminary removal of chloride ions, which comprises the steps of (a) adding a source of sulfate ions to said aqueous acidic ferruginous chloride solution; (b) adjusting the pH if necessary to a value in the range of 1.4 to 3.0; (c) contacting the solution from step (b) with said organic solution of an organic amine or quarternary ammonium compound whereby vanadate ions are transferred from the aqueous phase into the organic phase and iron, chloride and sulfate remain in the aqueous phase; (d) separating said phases, from step (c), thereby producing (e) an organic phase containing vanadium from which vanadium is stripped and recovered and (f) a spent chloride aolution.

2. The process of claim 1, wherein said source of sulfate ions is selected from the group consisting of sulfuric acid, magnesium sulfate, sodium sulfate, potassium sulfate and ammonium sulfate.

3. The process of claim 2, wherein said source of sulfate ions is magnesium sulfate.

4. The process of claim 1, wherein said source of sulfate added in step (a) is magnesium sulfate; in step (b) pH is increased to a value in the range of 1.4 to 3.0 by addition of a material selected from the group consisting of magnesium oxide, magnesium hydroxide, magnesium carbonate, and mixtures thereof, whereby said spent chloride solution (f) contains ions of sulfate, chloride, magnesium, and iron;

iron is precipitated from said spent chloride solution (f) by adding thereto a basic magnesium compound selected from the group consisting of magnesium oxide, magnesium hydroxide, magnesium carbonate or mixtures thereof, whereby the solution remaining after precipitation of iron from said spent chloride solution contains magnesium sulfate and magnesium chloride;

separating said precipitate from solution, and evaporating said solution until hydrated magnesium sulfate crystallizes on cooling and is separated from the mother liquid which comprises a solution of magnesium chloride; and recovering said crystallized magnesium sulfate.

5. The process of claim 4, wherein said recovered hydrated magnesium sulfate is recycled and used as the source of sulfate ions added to said ferruginous chloride solution in step (a).

6. The process of claim 1, wherein said aqueous ferruginous chloride solution contains one or more metals of the group consisting of aluminum, chromium, and manganese, which metal remains with iron during the steps (a), (b), (c), (d), (e), and (f), of said process.

7. The process of claim 1, wherein the quantity of sulfate ions added in step (a) depends upon the concentration of chloride ions and the relative proportions of iron and vanadium in said acidic aqueous ferruginous chloride solution and is used in amounts sufficient to avoid coextraction of iron in said organic phase in step (c).

8. The process of claim 1, where pH is in the range of 1.4 to 2.6 in step (b).

9. The process of claim 1, wherein pH is in the range of 1.5 to 2.6 in step (b).

* * * * *